United States Patent
Desai et al.

(10) Patent No.: US 6,986,641 B1
(45) Date of Patent: Jan. 17, 2006

(54) ENGINE CONTROL SYSTEM

(75) Inventors: Mihir C. Desai, Yorba Linda, CA (US); Tomasz J. Stanecki, Bristol, CT (US); Jeffrey S. Mattice, Enfield, CT (US)

(73) Assignee: Goodrich Pump & Engine Control Systems, Inc., Charlotte, NC (US)

( * ) Notice: Subject to any disclaimer, the term of this patent is extended or adjusted under 35 U.S.C. 154(b) by 89 days.

(21) Appl. No.: 10/614,364

(22) Filed: Jul. 7, 2003

Related U.S. Application Data

(62) Division of application No. 09/963,180, filed on Sep. 26, 2001, now Pat. No. 6,729,139.

(51) Int. Cl.
F02C 3/10 (2006.01)
F02C 9/28 (2006.01)

(52) U.S. Cl. .................. 416/44; 60/791; 60/39.281

(58) Field of Classification Search ............... 415/13, 415/16; 416/31, 43, 44
See application file for complete search history.

(56) References Cited

U.S. PATENT DOCUMENTS

| | | | |
|---|---|---|---|
| 4,411,595 A * | 10/1983 | Pisano | 416/33 |
| 4,423,593 A | 1/1984 | Zagranski et al. | |
| 4,453,378 A * | 6/1984 | Zagranski et al. | 60/39.281 |
| 4,466,526 A | 8/1984 | Howlett et al. | |
| 4,493,465 A | 1/1985 | Howlett et al. | |
| 4,531,361 A | 7/1985 | Zagranski et al. | |
| 4,648,797 A | 3/1987 | Martin | |
| 5,051,918 A | 9/1991 | Parsons | |
| 5,189,620 A | 2/1993 | Parsons et al. | |

OTHER PUBLICATIONS

European Search Report dated Sept. 29, 2003.
Morrison, T., Howlett, J.J., Zagranski, R.D., "Adaptive Fuel Control Feasibility Investigation for Helicopter Applications," 27th ASME International Gas Turbine Conference and Exhibit, 1982, XP008021720, p. 3, col. 1, p. 4, col. 2; figure 3.
Wong, T.H., "Designing and Stimulating the Engine Speed Governor for Helicopter Applications," ASME International Gas Turbine and Aeroengine Congress and Exposition, Jun. 5-8, 1995, XP0080211719.

* cited by examiner

*Primary Examiner*—Edward K. Look
*Assistant Examiner*—Richard A. Edgar
(74) *Attorney, Agent, or Firm*—David J. Silvia; Edwards & Angell, LLP

(57) ABSTRACT

A power turbine speed control system for a helicopter is disclosed which includes components for generating a power turbine speed signal based upon a demanded rotor speed, a high-order filter for filtering the power turbine speed signal by effectuating a rapid attenuation of main and tail rotor torsional frequencies in the power turbine speed signal without compromising phase at low frequencies, and a governor for providing isochronous power turbine speed and rotor speed control based upon the filtered power turbine speed signal.

7 Claims, 5 Drawing Sheets

ENGINE CONTROL SYSTEM

CROSS-REFERENCE TO RELATED APPLICATION

The subject application is a divisional application of U.S. patent application Ser. No. 09/963,180 filed Sep. 26, 2001 now U.S. Pat No. 6,729,139.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject invention relates to the operation of gas turbine engines, and more particularly, to a control system for a turboshaft engine of a helicopter which includes a wide-band speed governor.

2. Background of the Related Art

In rotary wing aircraft, and more particularly, in helicopters, the main and tail rotors define the primary flight control surfaces for the aircraft. The rotor drive train for the main and tail rotor is coupled to the power plant which can have a single or twin engine configuration. Engine response, is therefore critical to the control of the aircraft. Even more critical to the control of the aircraft is fast fuel flow response to the engine. Thus, it is desirable to provide a rotor speed control system with a high bandwidth enabled by increased proportional and derivative power turbine governing gains. This can be achieved by appropriate filtering of the speed feedback signal.

It is also desirable to provide a rotor speed control system that has increased main and tail rotor resonant frequency attenuation as compared to prior art control systems. It would also be desirable to provide a rotor speed control system that eliminates the need for yaw and lateral cyclic load anticpation.

These and other desirable attributes are achieved as part of the subject invention by providing a high-order filter in the speed control loop of the engine control system disclosed herein.

SUMMARY OF THE INVENTION

The subject invention is directed to a new and useful control system for a turboshaft engine of a helicopter. The control system includes a speed control loop with means for generating a power turbine speed signal based upon a demanded rotor speed, means for filtering the power turbine speed signal by effectuating a rapid attenuation of main and tail rotor torsional frequencies in the power turbine speed signal without compromising phase at low frequencies, and a governor for providing isochronous power turbine speed and rotor speed control based upon the filtered power turbine speed signal.

In accordance with the subject invention, the means for filtering the power turbine speed signal is a high-order filter. Preferably, the high-order filter is an eighth order filter. In an embodiment of the invention, the high-order filter is configured as three second order filters cascaded in series with two first order filters. Alternatively, the high-order filter is configured as a sixth order filter in series with a second order filter.

The speed control system of the subject invention further includes an optional active torsional damping loop for damping main and tail rotor torsional frequencies. The torsional damping loop includes a Kalman state estimator for estimating a plurality of engine states based upon one or more measured engine states, such as, for example power turbine shaft torque (QS). The torsional damping loop also includes a Linear Quadratic Regulator (LQR) that provides combustive damping.

These and other aspects of the subject invention will become more readily apparent to those having ordinary skill in the art from the following detailed description of the invention taken in conjunction with the drawings described hereinbelow.

BRIEF DESCRIPTION OF THE DRAWINGS

So that those having ordinary skill in the art to which the subject invention pertains will more readily understand how to employ the engine control system of the subject invention, preferred embodiments thereof will be described in detail hereinbelow with reference to the drawings, wherein.

DETAILED DESCRIPTION OF PREFFERED EMBODIMENTS

Several engine operating parameters are associated with a turboshaft engine for rotary wing aircraft and will be referred to in the description of the invention. These operating parameters include the following:

| | |
|---|---|
| NF* | Demanded Free Power Turbine Speed |
| NF | Free Power Turbine Speed |
| NG | Gas Generator Speed |
| NDOT* | Demanded Rate of Change of Power Turbine Speed |
| WF* | Demanded Fuel Flow |
| WF | Actual Fuel Flow |
| P3 | Compressor Discharge Pressure |
| HMU | Hydro-mechanical Unit |
| QGAS | Gas Generator Output Torque |
| QS | Power Turbine Shaft Torque |

Figure 1:
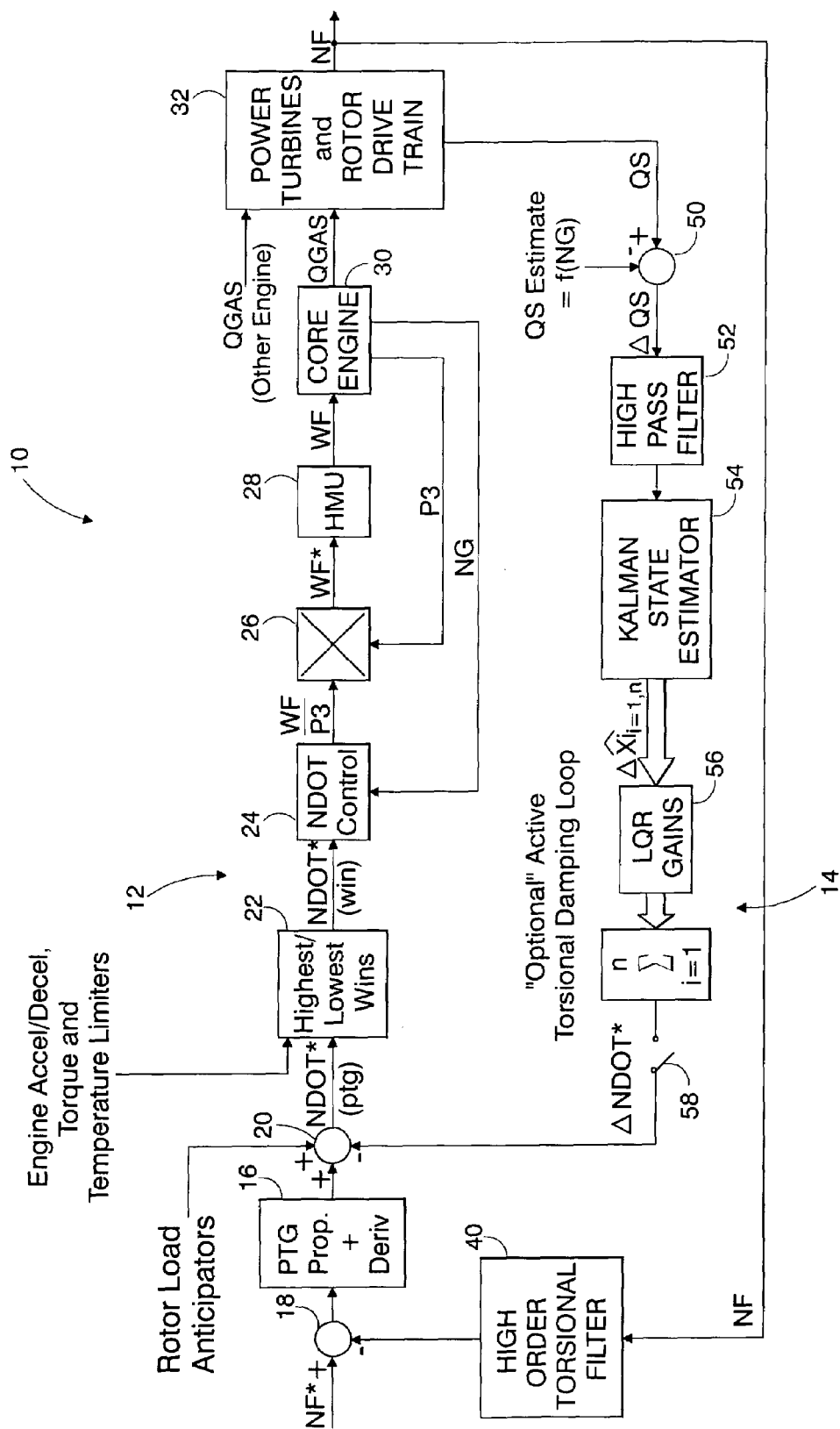
FIG. 1 is a schematic representation of the control system of the subject invention including an outer speed control loop with a high-order torsional filter, and an optional inner torsional damping loop.

Referring now to the drawings wherein like reference numerals identify similar features of the invention disclosed herein, there is illustrated in FIG. 1 a schematic representation of the engine control system of the subject invention which is designated generally by reference numeral 10. More particularly, the engine control system 10 includes an outer engine speed control loop 12 and an inner torsional damping loop 14 that may be selectively activated by the pilot of the aircraft. In accordance with the subject invention, the inner torsional damping loop 14 provides active damping of torsional resonance frequencies without significantly affecting the rotor speed governing loop 12 of the engine control system 10.

Speed Control Loop

The outer engine speed control loop 12 includes a Power Turbine Governor (PTG) 16 providing proportional and derivative control paths. The PTG receives an input signal from a primary summing junction 18. This signal is based upon the pilot's demanded rotor speed (NF*) and the filtered free turbine speed signal (NF). The PTG delivers an output signal to a secondary summing junction 20 which also receives input signals from rotor load anticipators and the optional torsional damping loop 14 when activated by the pilot. The resultant signal from summing junction 20 is indicative of the Demanded Rate of Change of the Gas Generator Speed (NDOT*). This signal is input into an auctioneering circuit 22 which incorporates software programming that determines a highest or lowest NDOT* value based upon engine limits related to acceleration/deceleration, torque and temperature.

A signal indicative of the winning NDOT* value is used as the input to the fuel control unit 24, together with a signal indicative of the gas generator speed (NG) sensed from the core engine 30. Based upon these signals, the fuel control unit 24 generates a proportional signal indicative of the fuel flow (WF) divided by the compressor discharge pressure (P3). This proportional signal is input into a multiplier junction 26 that receives a sensed signal indicative of the compressor discharge pressure (P3) of the core engine 30. As a result, the (P3) denominator is dropped from the proportional signal by the multiplier, and the resulting output signal from multiplier junction 26 is indicative of the demanded fuel flow (WF*).

A signal indicative of the demanded fuel flow (WF*) is input into the hydro-mechanical unit (HMU) 28 that includes, among other things, a fuel metering valve (not shown) for regulating the amount of fuel delivered to the core engine 30. Thus the demanded fuel flow corresponds to a demanded metering valve position.

A signal indicative of the engine output torque (QGAS) is transmitted from the core engine 30 to the power turbines and rotor drive train control unit 32, which, in turn produces two distinct signals. One signal is indicative of the free power turbine speed (NF), and the other signal is indicative of the power turbine shaft torque (QS). The signal indicative of NF is input into a high-order torsional filter 40, the function and configuration of which is described in detail hereinbelow. The signal indicative of QS is used as the input signal to the optional torsional damping loop 14, as will also be discussed hereinbelow with reference to FIG. 5.

Figure 2:
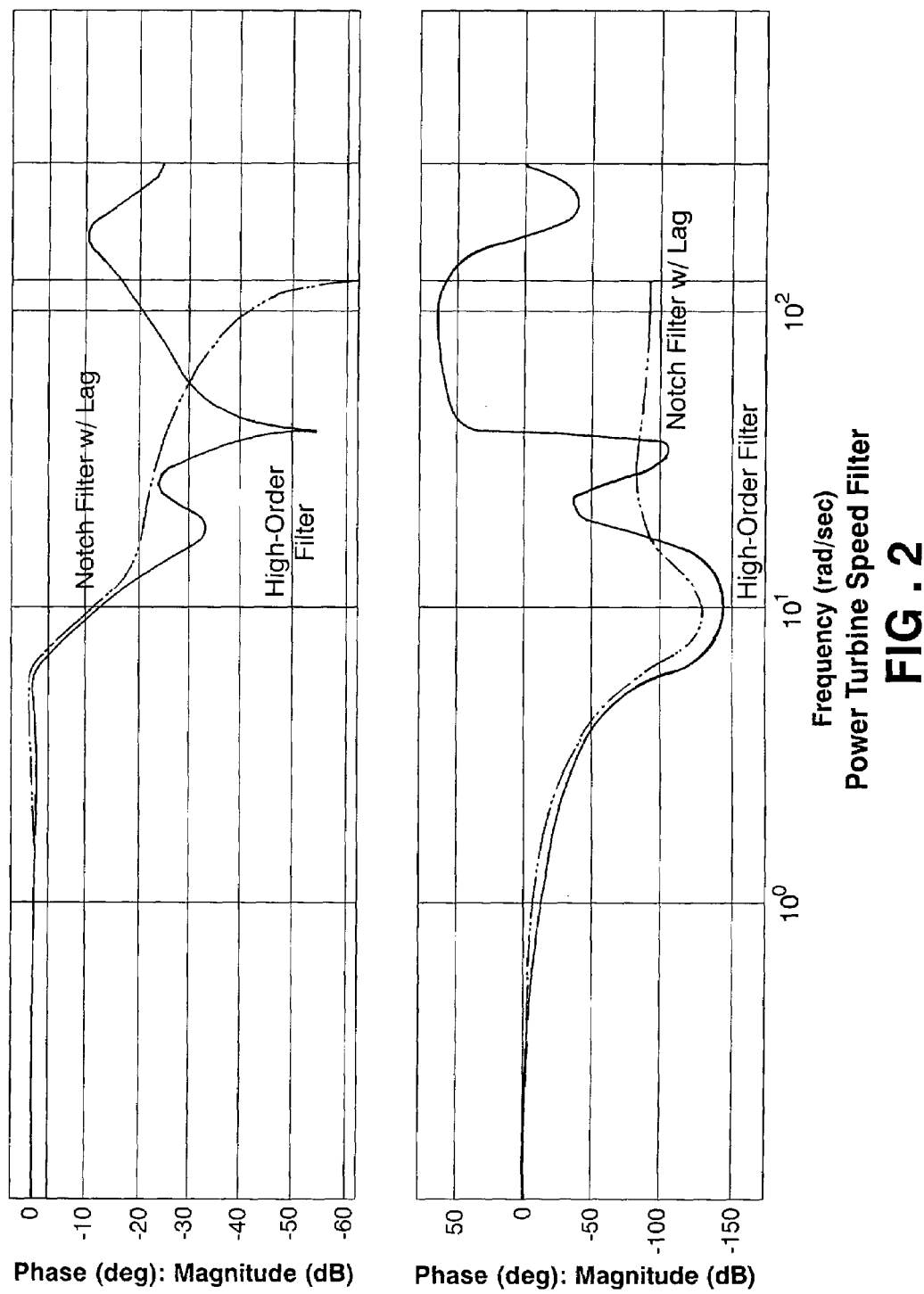
FIG. 2 is a bode diagram comparing a baseline notch/lag filter to the high-order filter of the subject invention.

Those skilled in the art will readily appreciate that the signal indicative of NF is a compound signal containing a plurality of contributing frequencies. Included among these frequencies, are the main and tail rotor torsional frequencies. The high-order filter 40 is adapted and configured to attenuate torsional oscillations in the power turbine speed signal (NF) that are directly associated with the main and tail rotors. Moreover, as illustrated in FIG. 2 and explained in Table 1, the high-order filter 40 provides greater attenuation of the main and tail rotor resonant frequencies, as compared to a baseline control system, in both single engine and twin engine configurations. This is exhibited by the sharp gain roll-off at the main and tail rotor resonant frequencies depicted in the upper bode plot of FIG. 2. As shown, the high-order filter also allows for the magnitude peak at about 30 rad/sec. Furthermore, as illustrated in the lower bode plot of FIG. 2, the high-order filter 40 functions to minimize the low frequency phase lag, as compared to a baseline control system. The increased attenuation provided by the high-order filter allows the proportional and derivative gains of the PTG to be increased by about a factor of three, as compared to a baseline control system. Consequently, the bandwidth of the outer turbine speed control loop 12 is increased by about a factor three as compared to the baseline control system.

Table 1.0 summarizes the differences in characteristics of the baseline and high-order torsional filter for single and twin engines coupled to the UH-60L Black Hawk rotor drive train.

TABLE 1.0

|  | Main Rotor Resonance | | | Tail Rotor Resonance | | |
| --- | --- | --- | --- | --- | --- | --- |
|  | Frequency | High-Order Filter Attenuation | Baseline Notch/Lag Attenuation | Frequency | High-Order Filter Attenuation | Baseline Notch Lag Attenuation |
| One Engine | 17.75 rad/s | 32.2 dB | 21.2 dB | 42.50 rad/s | 44.5 dB | 26.1 dB |
| Twin Engine | 18.85 rad/s | 28.0 dB | 20.5 dB | 37.00 rad/s | 40.7 dB | 24.9 dB |

Figure 3:
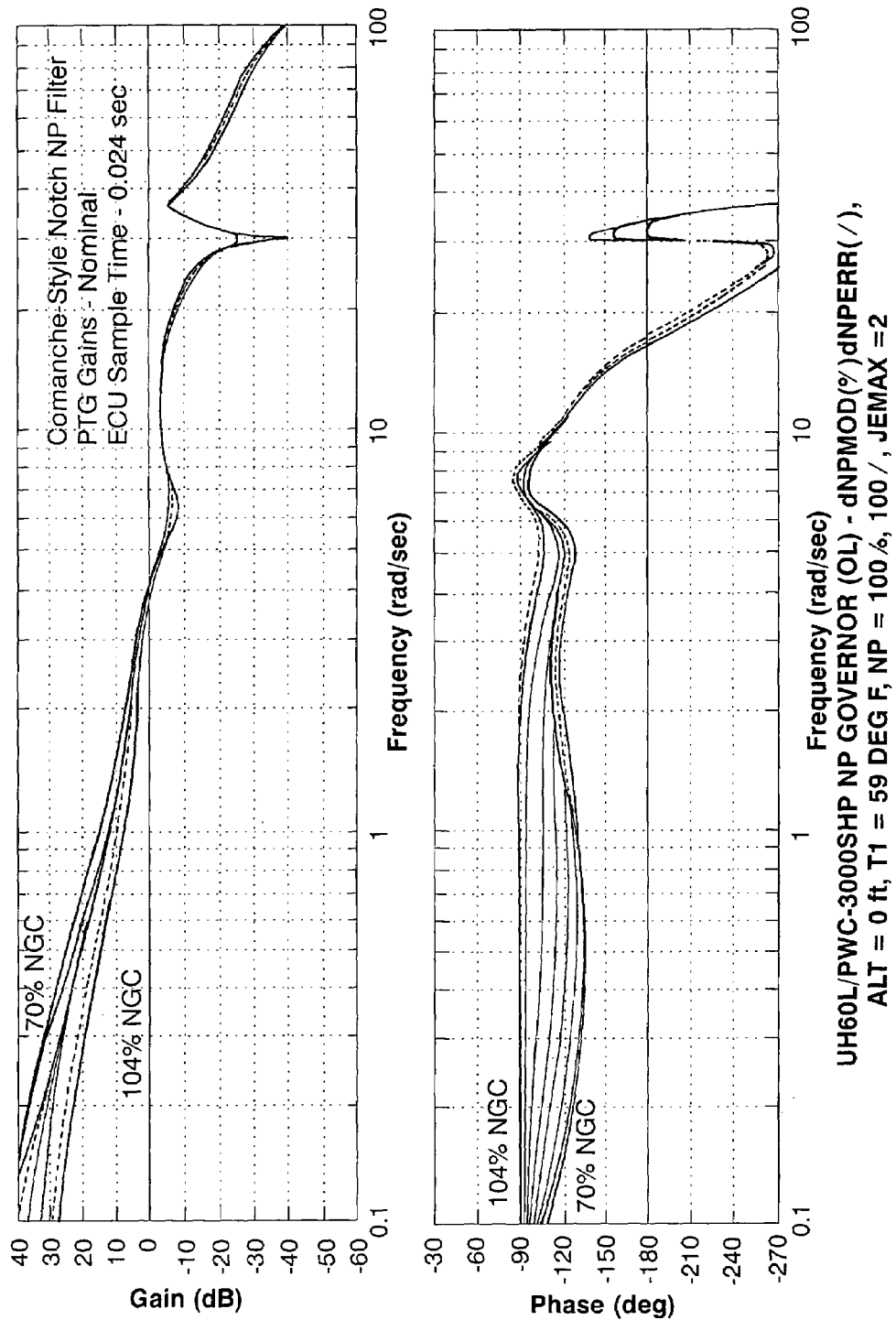
FIG. 3 is a baseline control open loop bode diagram using a notch filter.
Figure 4:
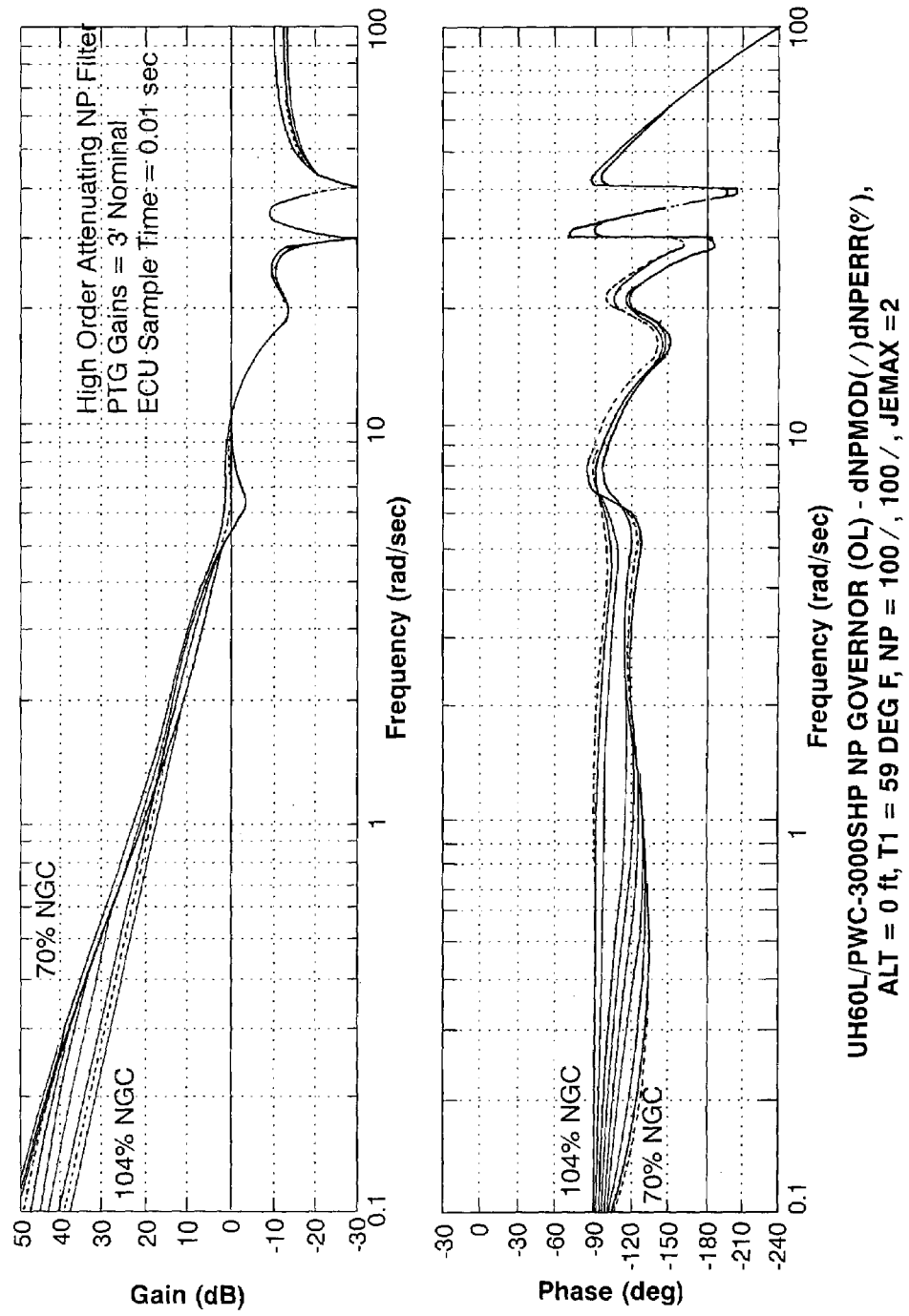
FIG. 4 is a wide-band governor open loop bode plot using a high-order attenuating filter.

Referring now to FIGS. 3 and 4, there are illustrated open loop bode diagrams for twin engine operation at sea level, standard day ambient conditions for the baseline and wide-band governor system. As illustrated in the upper plot of FIG. 3, the cross-over frequency at unity gain or the bandwidth of the baseline control system is about 3–4 rad/sec. In contrast, as illustrated in the upper plot of FIG. 4, the cross-over frequency or bandwidth of the wide-band governor is about 8–10 rad/sec. This represents an increase in bandwidth on the order of two to three times that of the baseline system.

The bode diagrams at altitudes of 4000 and 10,000 feet have similar shapes with characteristics shown in the following tables. Table 2.1 presents a summary of the baseline system's power turbine governor control loop stability margins and open loop system bandwidth for twin engine operation when coupled to the rotor drive train. The tail rotor torsional attenuation exceeds that of the main rotor, therefore the torsional attenuation listed in the table represents that of the main rotor.

TABLE 2.1

| Alt. | | Gain Margin (dB) | | Phase Margin (°) | | Open loop Bandwidth | | Main Rotor Attenuation | |
| --- | --- | --- | --- | --- | --- | --- | --- | --- | --- |
| (ft) | (° F.) | Min | Max | Min | Max | Min | Max | Min | Max |
| 0 | 59 | 5.8 | 6.8 | 56.9 | 91.2 | 3.07 | 4.18 | 5.3 | 6.4 |
| 4K | 95 | 6.3 | 7.0 | 53.5 | 87.2 | 3.01 | 4.14 | 6.0 | 6.5 |
| 10K | 23.3 | 6.6 | 8.0 | 67.3 | 95.2 | 2.05 | 3.06 | 6.2 | 7.2 |

Table 2.2 presents a summary of the wide-band governor control loop stability margins and open loop system bandwidth for twin engine operation when coupled to the rotor drive train. The increased open loop bandwidth is due to tripling the PD gains, It should be noted hat there is no significant decrease in the main torsional frequency attenuation despite the increase in bandwidth.

TABLE 2.2

| Alt. | | Gain Margin (dB) | | Phase Margin (°) | | Open loop Bandwidth | | Main Rotor Attenuation | |
|---|---|---|---|---|---|---|---|---|---|
| (ft.) | (° F.) | Min | Max | Min | Max | Min | Max | Min | Max |
| 0 | 59 | 8.4 | 9.6 | 53.7 | 79.4 | 5.45 | 11.52 | 5.5 | 6.6 |
| 4K | 95 | 9.2 | 13.0 | 50.9 | 81.3 | 5.42 | 10.32 | 5.7 | 6.9 |
| 10K | 23.3 | 10.3 | 14.6 | 57.0 | 82.3 | 5.06 | 5.60 | 5.7 | 7.8 |

The analysis was performed using a simulated Comanche-style stepper motor based fuel metering system as well as a variable displacement vane pump (VDVP) based fuel metering system operating with twin PWC 3000 SHP 2.5 second engines as well as twin empirical 3000 SHP one-second engines.

The wide-band governor of the subject invention runs on an ECU with a sampling time of ten milliseconds. The high-order filter allows for a tripling of proportional and derivative (PD) gains when compared to the baseline control. The wide-band governor of the subject invention is configured to maintain open loop gain and phase margins of at least 6 dB and 45° respectively, throughout the powered region of the engine operating envelope when coupled to the rotor drive train. This configuration provides stable, responsive and well damped power turbine speed control.

The baseline speed control loop incorporates, in the feedback path, a second order attenuating lead-lag (notch) filter, sized for the Black Hawk helicopter, cascaded in series with a first order lag filter to provide gain attenuation of the main and tail rotor resonant modes.

In contrast, the wide-band governor speed control loop of the subject invention incorporates, in the feedback path, an eighth order attenuating filter to provide increased gain attenuation of the main and tail rotor resonant modes. The high-order filter is sized to minimize the phase lag in the low frequency region (below 10 rad/sec) while providing more attenuation of the main and tail rotor resonant peak amplitudes than the baseline filters. Additionally, the anti-resonant notch frequencies of the high-order filter are sized to account for the effective torsional frequency shifts between the single and twin coupled engine operation.

The high-order filter of the subject invention can be configured as three second order (notch) filters cascaded in series with two first order lead/lag filters. Alternatively, the high-order torsional filter can be configured as a sixth order lead/lag filter in series with a second order lead/lag filter.

Yaw anticipation in an engine control system is designed to accommodate the change in rotor load resulting immediately from changes in tail rotor pitch. Similarly, lateral cyclic anticipation in an engine control system is designed to accommodate the change in rotor load resulting from right/left lateral rolls. The increased bandwidth of the outer speed loop 12 of control system 10 eliminates the need for yaw and lateral cyclic open loop load anticipation. It has been determined however, that open loop anticipators are necessary for rotor decay anticipation and collective pitch anticipation. Accordingly, the control system of the subject invention does incorporate appropriate rotor load anticipators.

Optional Torsional Damping Loop

Referring once again to FIG. 1, the engine control system 10 of the subject invention includes an optional active inner torsional damping loop 14. Damping loop 14 receives a signal indicative of the measured power turbine shaft torque (QS) from a sensor operatively associated with the power turbines and the rotor drive train. The measured signal input into a summing junction 50 which also receives an estimated QS which is a function of gas generator speed (NG). The difference between the actual QS and the estimated QS, otherwise referred to as the ΔQS from the summing junction, is input into a high pass filter 52. This high pass filter effectively nulls out any steady state errors in the signal, and allows only the torsional frequencies to pass therethrough.

The filtered signal is then sent to a Kalman state estimator 54 which is programmed to estimate twelve different dynamic variables associated with the power turbines and rotor drive train using the measured QS to estimate all of the other states or dynamic variables for feedback control. The twelve states estimated by the Kalman estimator are defined as follows:

$\hat{x}_1$=Main Rotor Gearbox Speed (ΔNGB)

$\hat{x}_2$=Main Rotor Speed (ΔNR)

$\hat{x}_3$=Effective Lag Hinge Damper Velocity (ΔNLHD)

$\hat{x}_4$=Main Rotor Shaft Torque (ΔQRS)

$\hat{x}_5$=Tail Rotor Speed (ΔNT)

$\hat{x}_6$=Gas Generator High Pressure Turbine Speed (ΔNH)

$\hat{x}_7$=Engine Burn Flow (ΔWfburn)

$\hat{x}_8$=Power Turbine Speed (ΔNF)

$\hat{x}_9$=NDOT Control Output (ΔWF/P3)

$\hat{x}_{10}$=HMU Output Fuel Flow (ΔWF)

$\hat{x}_{11}$=Tail Rotor Shaft Torque (ΔQTS)

$\hat{x}_{12}$=Power Turbine Shaft Torque (ΔQS)

The twelve estimated states are input into a Linear Quadratic Regulator (LQR) 56 where they undergo gain reduction/amplification and summation, as described in more detail hereinbelow with respect to FIG. 5. The resulting control signal is indicative of ΔNDOT* and is passed to summing junction 20 where it is added to the power turbine governor output signal and the signal from the rotor load anticipators. As noted above, the active damping loop 14 is optional. Accordingly, the inner loop 14 includes a switching gate 58 that follows the LQR summing junction, that may be selectively actuated to activate the damping loop.

Figure 5:
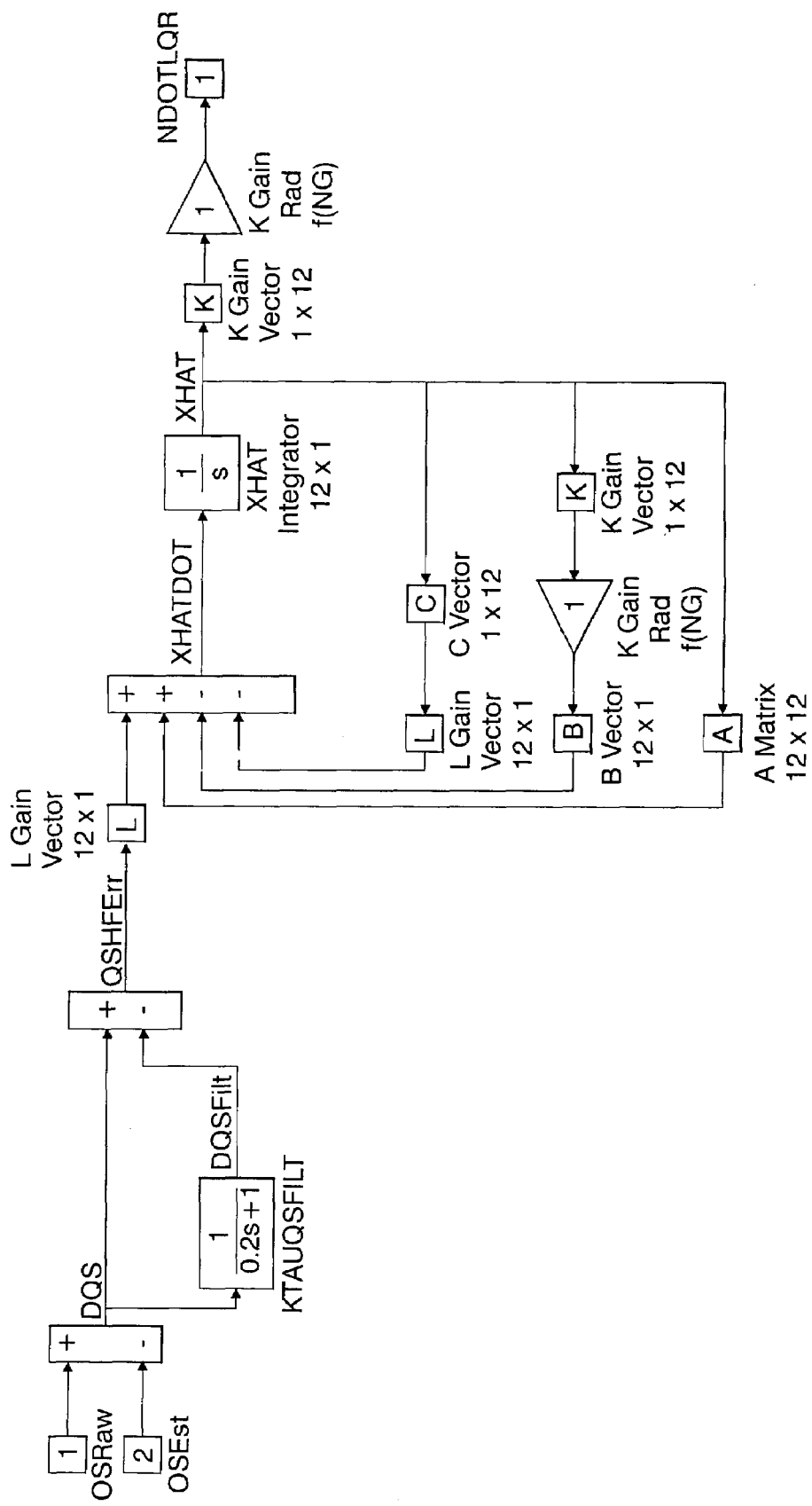
FIG. 5 is a diagram illustrating the signal flow through the optional torsional damping loop of the control system of FIG. 1.

The functional operation of the LQR and Kalman estimator is illustrated in FIG. 5. As shown, the measured raw shaft torque and the estimated shaft torque are summed to produce a ΔQS. The ΔQS is input into a high pass $K_7QS$ filter which effectively nulls out steady state error in the shaft torque signal and generates a filtered ΔQS which is summed with the unfiltered ΔQS to produce a shaft torque signal indicative of the torsional frequencies of the rotor drive system.

The resultant signal is applied to a (12×1) Kalman gain vector containing the twelve estimated dynamic state variables discussed above. The resulting values are input into a Kalman summing junction which receives three additional feedback signals indicative of various dynamic properties of the control system architecture (A, B and C). The summing junction produces an $\bar{X}$DOT vector that is input into a (12×1) integrator to generate a signal indicative of $\bar{X}$.

The three additional feedback signals sent to the Kalman summing junction follow from the integrated $\bar{x}$. The first feedback loop includes a (12×1) output vector C and a (1×12) Kalman gain vector. The second feedback loop includes a (1×12) K or LQR gain vector, a gain reducer and a (12×1) input vector B. The third feedback loop includes a (12×12) dynamic property vector A. The signals from the three feedback loops and summed at the Kalman summing junction with the primary Kalman gain vector. The output signal from the $\bar{x}$ integrator is summed and reduced as a function of gas generator speed (NG), resulting in the aforementioned ΔNDOT*.

The design of the Linear Quadratic Regulator (LQR) is based upon the following methodology. For the linearized system defined by the following equations:

$$\dot{x} = Ax + B\mu$$

$$y = Cx$$

where:
  $\chi$=Plant (engine) States
  $\mu$=NDOT Demand
  y=Output of Interest, i.e., QS The optimal regulator problem is to find state feedback control $\mu = -K\chi$ such that the cost function:

$$J = \int_0^\infty \frac{1}{2}(x^T Q x + \mu^T R \mu) dt$$

is minimized where Q and R are state and control weighting functions, respectively. In this problem, Q must be chosen so as to obtain a control that provides combustive damping. Thus, Q must be chosen so as the total torsional energy in the rotor drive train, which is represented by the following equation:

$$E = \frac{1}{2}J_R N_R^2 + \frac{1}{2}K_R \theta_R^2 + \frac{1}{2}J_T N_T^2 + \frac{1}{2}K_T \theta_T^2$$

where $\theta R$ and $\theta T$ are the main and tail rotor twist angles, respectively, $N_R$ and $N_T$ are the main and tail rotor speeds, respectively; $K_R$ and $K_T$ are the main and tail rotor stiffness factors, and $J_R$ and $J_T$ are the main and tail rotor moments of inertia.

Since $$\theta_R = \frac{Q_R}{K_R}, \theta_T = \frac{Q_T}{K_T};$$

It follows that the energy functional equation is:

$$E = \frac{1}{2}\left(J_R N_R^2 + \frac{Q_R^2}{K_R} + J_T N_T^2 + \frac{Q_T^2}{K_T}\right)$$

and it is expressed in terms of the rotor system dynamic states. By solving the LQR problem using conventional techniques and using the function total energy in the rotor system, a control is obtained that drives the rotor system energy to zero in the shortest possible time, resulting in combustive damping. Furthermore, an appropriate choice of control weight R will yield a controller that is a trade-off between performance (i.e., the amount of damping) and stability margin.

The Kalman estimator is designed as an adjunct problem to the LQR problem whereby state weight Q is selected to be the identity matrix so that the estimated states are driven to be equal to actual values, and control weight R is chosen to give acceptable bandwidth (e.g., 70 rad/sec) and to attenuate higher frequencies.

Although the control system of the subject invention has been described with respect to preferred embodiments, those skilled in the art will readily appreciate that changes and modifications may be made thereto without departing from the spirit and scope of the present invention as defined by the appended claims.

What is claimed is:

1. A power turbine speed control system for a helicopter comprising:
   a) means for generating a power turbine speed signal based upon a demanded speed;
   b) means for filtering the power turbine speed signal by effectuating a rapid attenuation of main and tail rotor torsional frequencies in the power turbine speed signal without compromising phase at low frequencies;
   c) a governor for providing isochronous power turbine speed and rotor speed control based upon the filtered power turbine speed signal; and
   d) damping means for actively damping main and tail rotor torsional frequencies.

2. A power turbine speed control system as recited in claim 1, wherein the damping ineans includes means for estimating a plurality of engine states based upon a single measured engine state.

3. A power turbine speed control system as recited in claim 2, wherein the single measured engine state is power turbine shaft torque.

4. A power turbine speed control system as recited in claim 1, wherein the damping means includes a linear quadratic regulator that provides combustive damping.

5. A power turbine speed control system as recited in claim 1, further comprising means for selectively activating the damping means.

6. A turbine speed control system as recited in claim 1, wherein the damping means is tuned to provide attenuation of resonant frequencies so as not to influence low frequency response of the system.

7. A power turbine speed control system as recited in claim 6, wherein the damping means includes a high pass filter.

* * * * *